(12) United States Patent
Bolouri-Saransar et al.

(10) Patent No.: US 11,682,976 B2
(45) Date of Patent: Jun. 20, 2023

(54) DC VOLTAGE DETECTOR ISOLATION CIRCUIT

(71) Applicant: Panduit Corp., Tinley Park, IL (US)

(72) Inventors: Masud Bolouri-Saransar, Orland Park, IL (US); Walid Balid, Orland Park, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 17/977,472

(22) Filed: Oct. 31, 2022

(65) Prior Publication Data

US 2023/0050028 A1 Feb. 16, 2023

Related U.S. Application Data

(63) Continuation of application No. 16/398,500, filed on Apr. 30, 2019, now Pat. No. 11,489,447.

(60) Provisional application No. 62/665,171, filed on May 1, 2018.

(51) Int. Cl.
*H02M 3/335* (2006.01)

(52) U.S. Cl.
CPC ................ *H02M 3/33523* (2013.01)

(58) Field of Classification Search
CPC ... H02M 3/33523; H02M 3/335; H02M 3/156
See application file for complete search history.

(56) References Cited

U.S. PATENT DOCUMENTS

| 8,964,422 B2 | 2/2015 | Shi et al. |
| 2006/0164868 A1 | 7/2006 | Weber |
| 2017/0085189 A1 | 3/2017 | Madsen |
| 2018/0175741 A1* | 6/2018 | Andersen ............. H02M 3/155 |

* cited by examiner

*Primary Examiner* — Adolf D Berhane
*Assistant Examiner* — Afework S Demisse
(74) *Attorney, Agent, or Firm* — Christopher S. Clancy; James H. Williams; Christopher K. Marlow

(57) ABSTRACT

In one embodiment, a power supply circuit has a power source, an inductor in series with a switching transistor connected to the power source, a pair of isolation capacitors connected across the switching transistor, a load connected to the isolation capacitors such that they isolate the load from low frequency energy from the power source, and a resonance circuit configured to amplify resonant ringing connected at least one of in parallel to the inductor or in parallel to the switching transistor.

1 Claim, 7 Drawing Sheets

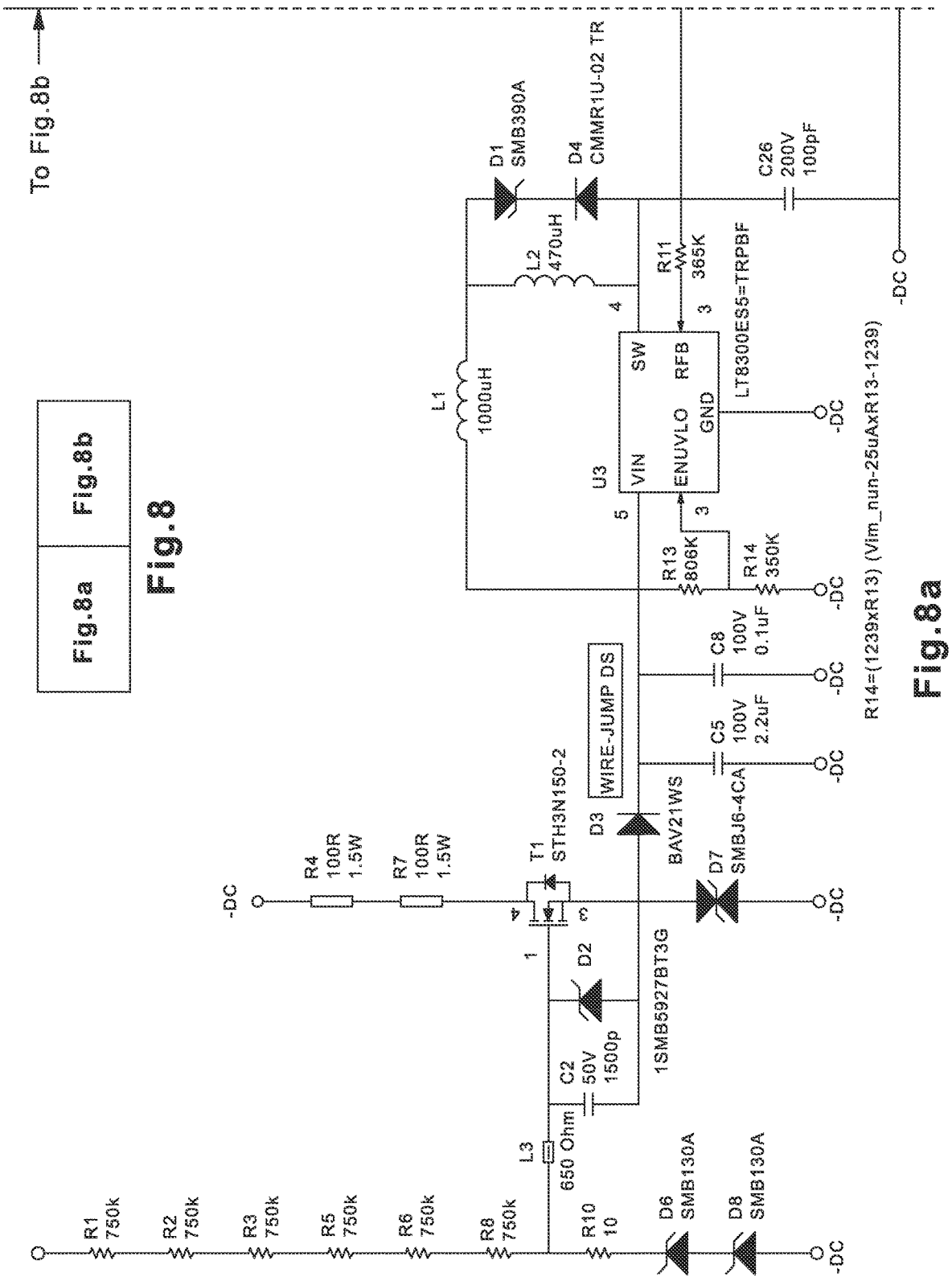

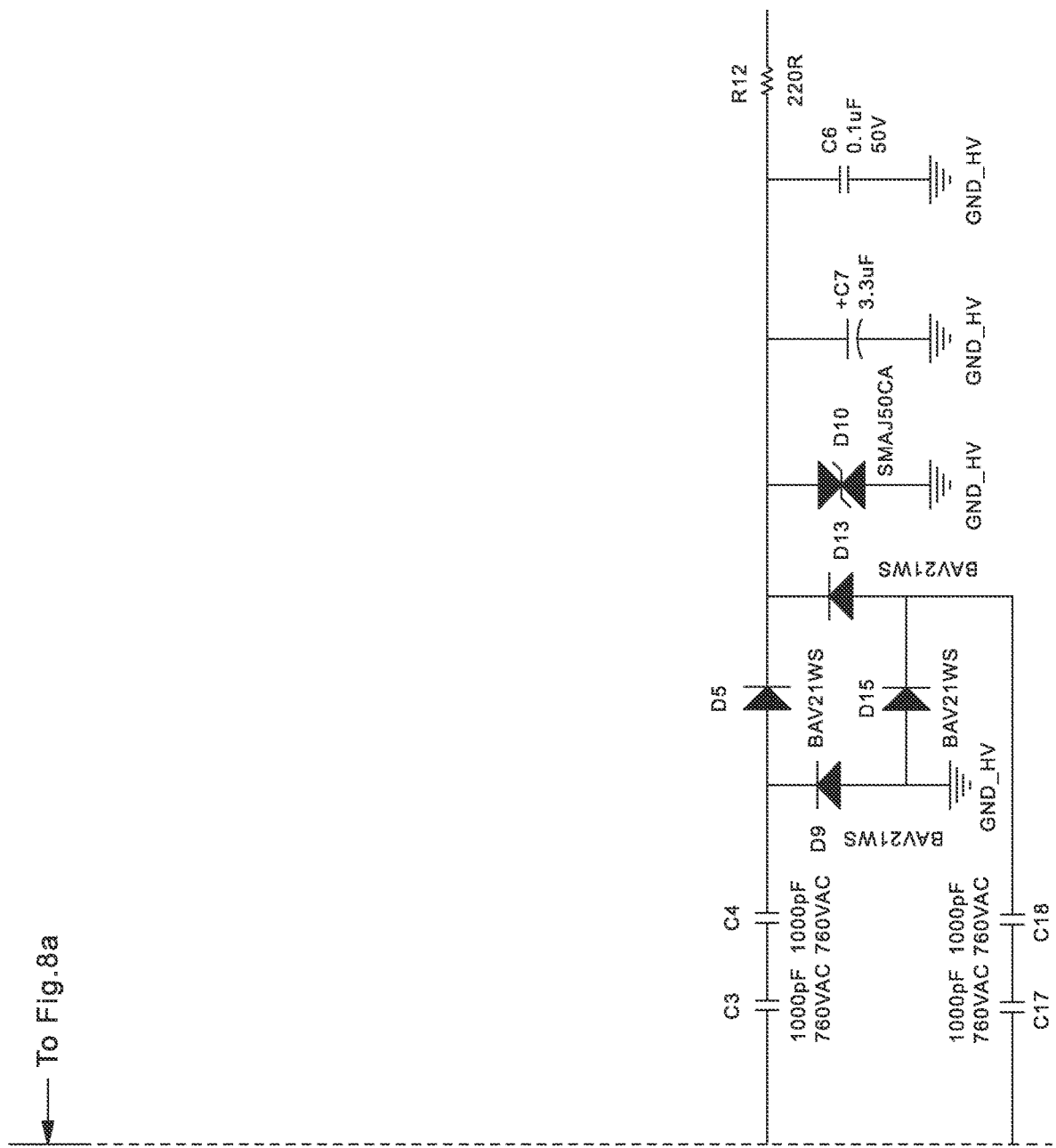

DC VOLTAGE DETECTOR ISOLATION CIRCUIT

CROSS-REFERENCE TO RELATED APPLICATIONS

This application is a continuation of U.S. patent application Ser. No. 16/398,500, filed Apr. 30, 2019, which issued as U.S. Pat. No. 11,489,447 on Nov. 1, 2022, and claims priority to U.S. Provisional Application No. 62/665,171, filed May 1, 2018, the subject matter of which is hereby incorporated by reference in its entirety.

FIELD OF THE INVENTION

The present application relates generally to DC voltage detection and more specifically to modifying a flyback converter to take advantage of resonant ringing to allow for smaller isolation capacitors and/or a lower switching frequency.

BACKGROUND

Isolated power-supply circuits are generally structured in a way that has a power source section drive the primary of a transformer. Then the secondary side of the transformer is typically connected to the load side of the power supply. FIG. 1 shows a typical flyback power supply circuit 100 with a DC power source 102, switching transistor 104, transformer 106, and a load 108.

In some applications, in which low power is needed, capacitors can be substituted for the transformer in providing isolated power transfer. Typical such uses include low power LED lights on AC power lines. When the power source is DC, an oscillator/pulse generator is needed to convert it to AC. The AC voltage facilitates use of transformer or capacitors to construct an isolated power-supply. A typical example of this practice is used in flyback convertors using small transformers; however, this is not an optimum technique in low power applications since the primary side is at a much higher voltage than the secondary side, for example, when the primary side is 1 KV, the secondary side is 5V, and the required isolation is over 10 KV. Such constraints of size and cost may favor using capacitors versus transformers in low power applications. FIG. 2 shows a power supply circuit that 200 that replaces the transformer with an inductor 212 and isolation capacitors 210 as an isolation technique.

Utilizing capacitors presents some opposing considerations in a high voltage to low voltage power supply application. Transfer of power from the primary side to the secondary side through capacitors is dependent upon the capacity of the capacitors, the frequency spectrum of the switching (how fast is the rise and fall time), and the switching frequency (how often the switching occurs).

In applications where high voltage isolation is required, due to cost and size considerations, utilizing low value capacitors is desired. Reducing the switching time in a high voltage application will permit using lower value capacitance; however, it requires fast transistors, a robust gate driver, and a complex EMI filter preventing propagation of switching noise to the power source. In addition, the parasitic elements in a switching power supply such as leakage inductance in the inductor, primary winding capacitance in the transformer, and capacitance loss of the MOSFET creates a parasitic LC network. The parasitic LC tank network will cause transient voltage spikes or ringing waveforms every time switching occurs which will need to be contained. The transient voltage spikes can be damped using RC or RCD snubber networks 314 as shown in the power supply circuit 300 of FIG. 3. The snubber networks 314 remove the transient energy and convert it to heat. The lost energy that the snubber networks combined with the energy when transistor is in active region while it is switching are factors that will need to be considered when determining the switching frequency. High switching frequency will compromise the efficiency of the power supply.

SUMMARY

In one embodiment, a power supply circuit has a power source, an inductor in series with a switching transistor connected to the power source, a pair of isolation capacitors connected across the switching transistor, a load connected to the isolation capacitors such that they isolate the load from low frequency energy from the power source, and a resonance circuit configured to amplify resonant ringing connected at least one of in parallel to the inductor or in parallel to the switching transistor.

BRIEF DESCRIPTION OF THE DRAWINGS

FIGS. 8a and 8b show a resonance circuit with overvoltage protection.

DETAILED DESCRIPTION OF THE INVENTION

The proposed method is centered on utilizing the resonance parasitic or ringing component of a switching power supply at the switching stage. By amplifying the parasitic ringing (instead of using a snubber circuit to dampen it), it can be modified and managed to contain more power and its frequency content can be optimized. Since the resonant parasitic ringing has a much higher frequency spectrum compared to the switching frequency of the power supply, smaller isolation capacitors may be used.

Figure 4:
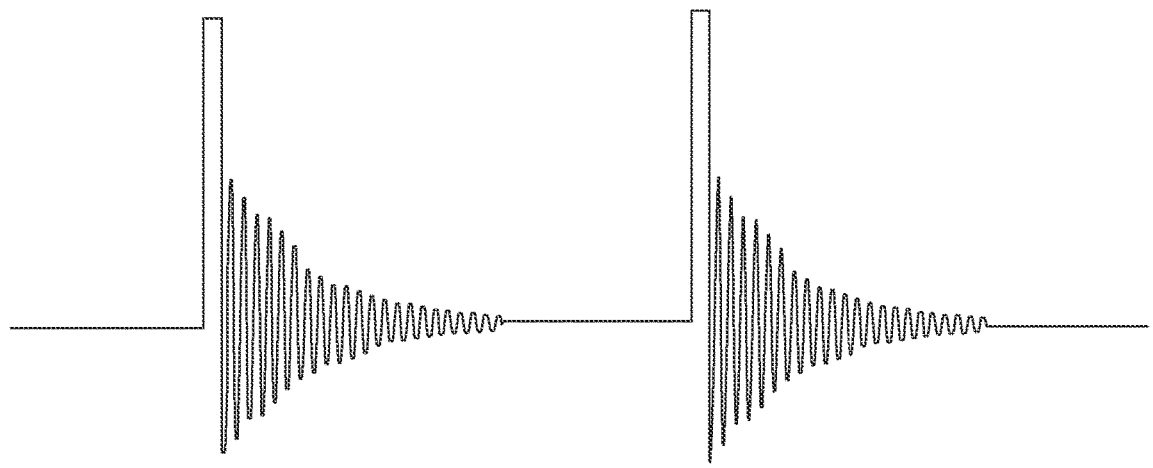
FIG. 4 shows the amplified ringing at the coupling capacitors.

In addition, using this technic, the switching frequency can be reduced, hence the efficiency of the power supply will increase. FIG. 4 illustrates the amplified ringing at the coupling capacitors. As such, the amplification of the resonant ringing allows a combination of smaller isolation capacitors and lower frequency switching transistors to be used to detect the presence of a DC voltage.

Figure 1:
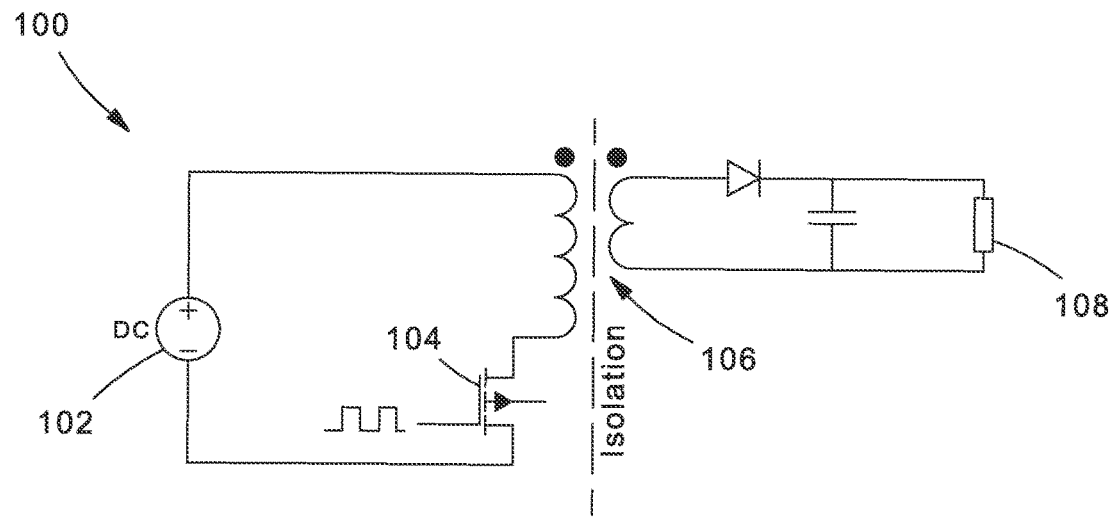
FIG. 1 shows a typical flyback power supply circuit using a transformer for isolation between the supply and load sides of the circuit.
Figure 2:
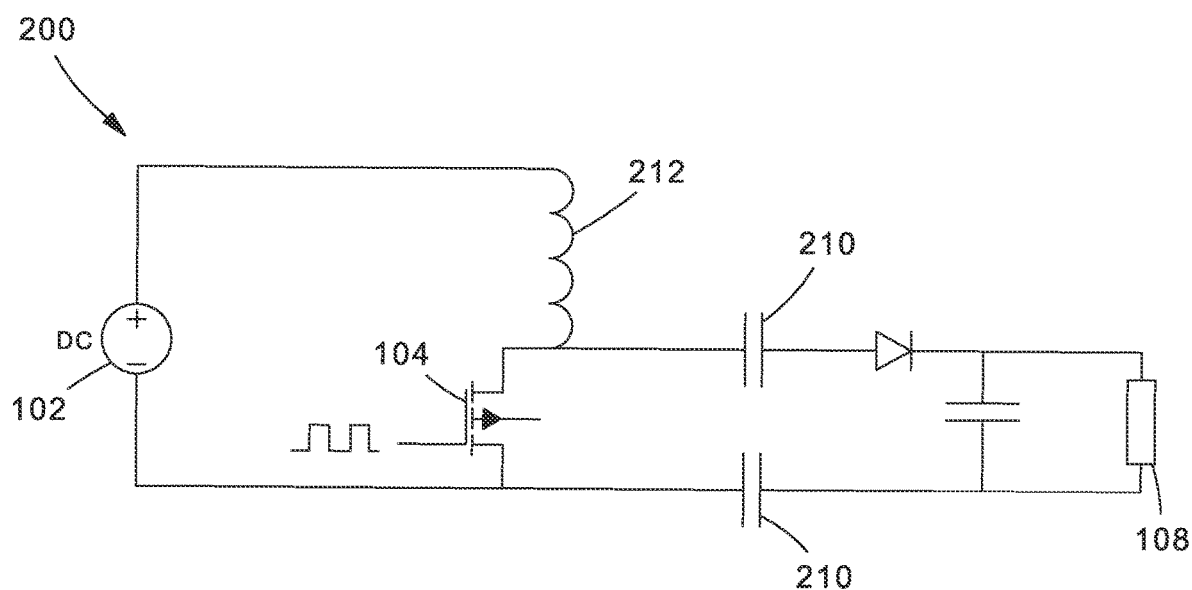
FIG. 2 shows a flyback power supply circuit using capacitors to isolate the load side of the circuit.
Figure 3:
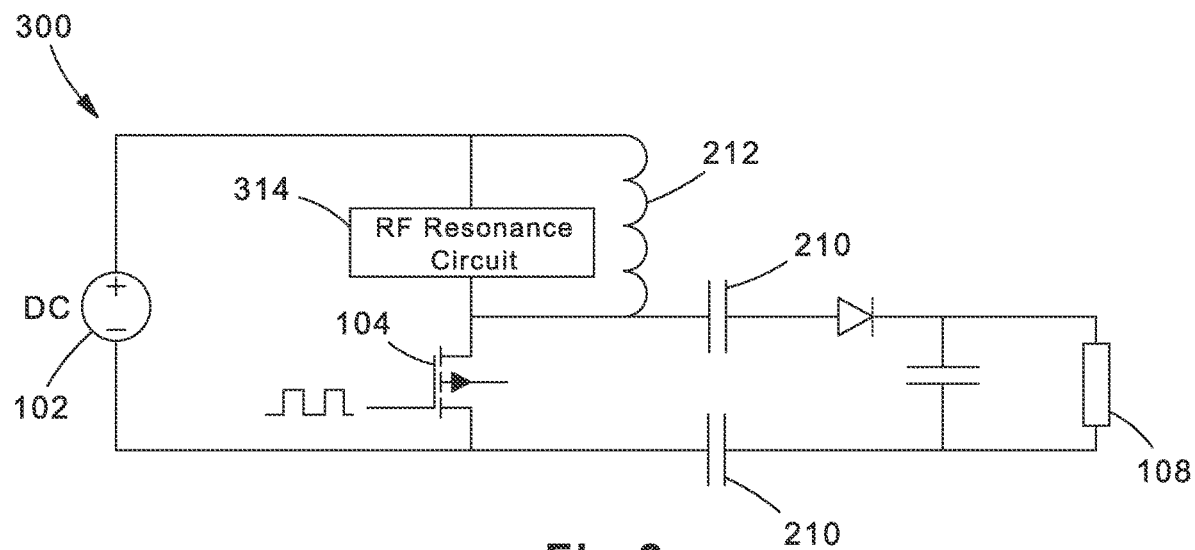
FIG. 3 shows the flyback power supply circuit of FIG. 2 with a snubber circuit added.
Figure 5:
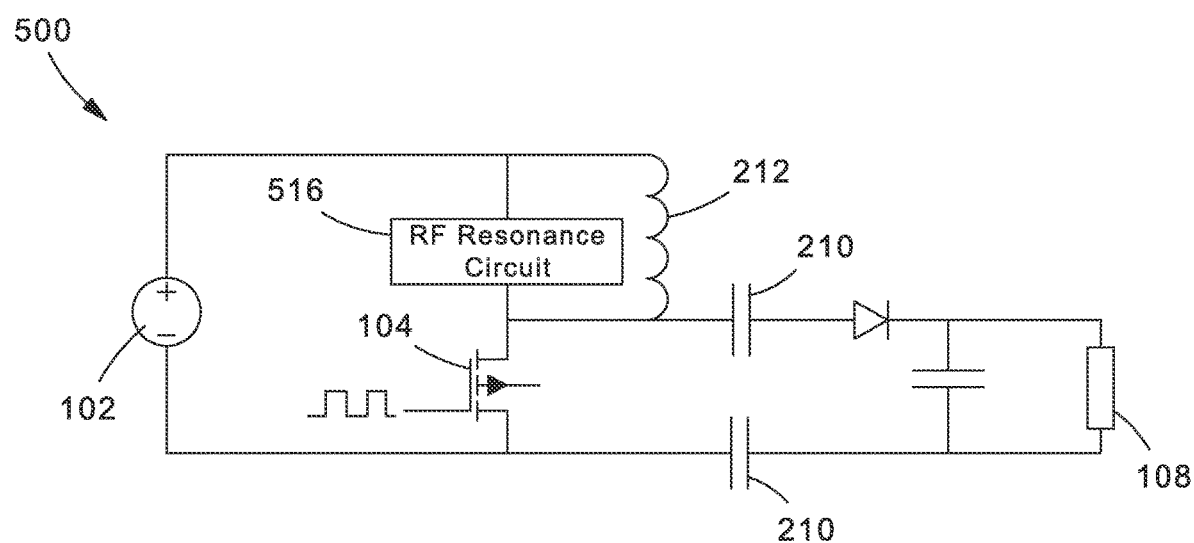
FIG. 5 shows one embodiment of the present invention which includes replacing the subber circuit with a resonance circuit configured to amplify the resonant ringing.

FIG. 5 shows one embodiment of the present invention. It is similar to FIG. 3 except it shows a system 500 where the snubber circuit has been replaced with a resonance circuit 516 that is configured to amplify the resonant ringing of the switching power supply 102.

Figure 6A:
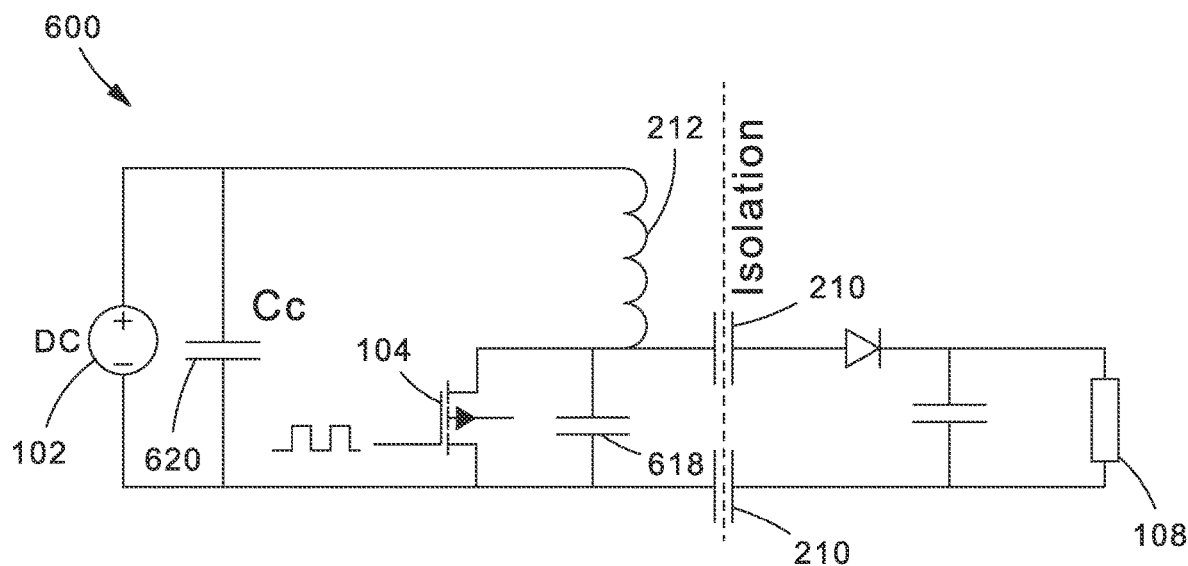
FIG. 6a shows one technique of implementing the circuit of FIG. 5 in which a capacitor is placed in parallel to the inductor.
Figure 6B:
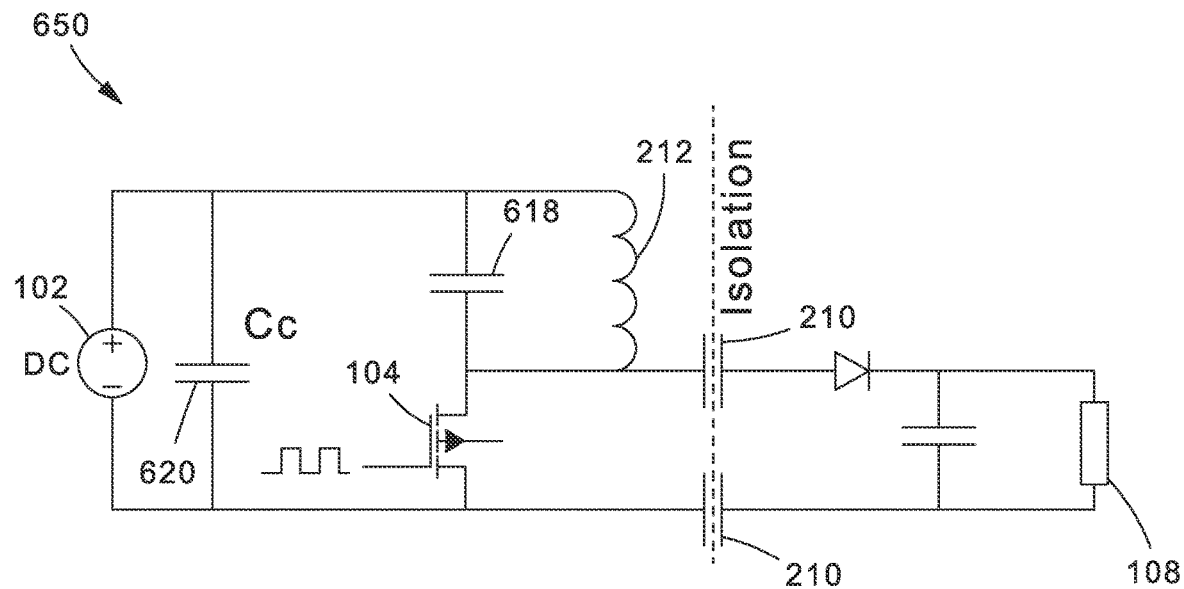
FIG. 6b shows a second technique of implementing the circuit of FIG. 5 in which a capacitor is placed in parallel with the switching transistor.

FIGS. 6a and 6b show two systems 600, 650 using two different techniques of implementing the present invention. In the system 600 using the first technique, a resonant capacitor 618 is placed in parallel with the switching transistor 104 (FIG. 6a). In the system 650 using the second technique, the resonant capacitor 618 is added parallel to the inductor 212 (FIG. 6b). Inserting a series LC circuit in parallel with main inductor or in parallel with the transistor can enhance the power of the ringing resonance.

The capacitor Cc 620 provides a low loss return path for the resonance signal and the value of it is much higher than the capacitor in the LC resonant circuit. In the most switching power supplies using Cc is common practice nonetheless.

While particular embodiments and applications of the present invention have been illustrated and described, it is to be understood that the invention is not limited to the precise construction and compositions disclosed herein and that various modifications, changes, and variations may be apparent from the foregoing without departing from the spirit and scope of the invention as described.

Figure 7:
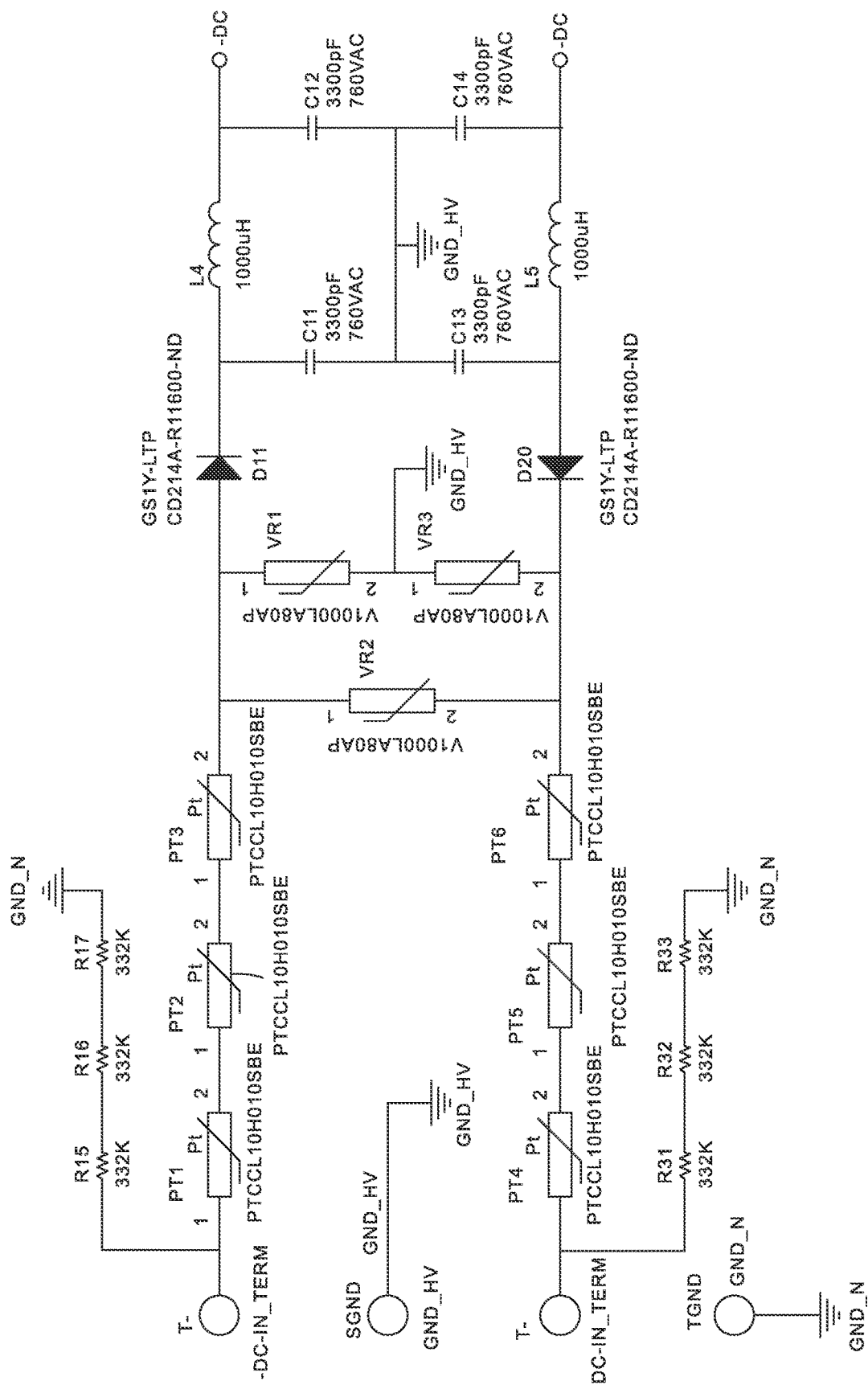
FIG. 7 shows a resonance circuit with reverse polarity protection and an EMI filter.

Reverse-Polarity Protection and EMI Filter:

Reverse-polarity protection circuit employs in series diodes that allow current flow in one direction. D11 and D20 (See FIG. 7) are forward biased diodes with 1.6 KV maximum DC blocking voltage. They are also used as half-bridge rectifier in case of AC source input. A full diode bridge rectifier will be used so that the circuit works regardless of the input current source (AC/DC) or polarity.

PT1 through PT6 (See FIG. 7) are 1.6KΩ PTC Thermistors rated at 600V. They provide over-temperature and over-load protection to the circuit. They also allow any tripped component to turn off by cutting-off the follow and protecting against catastrophic circuit failure. The Thermistors are connected in series to meet maximum bus voltage of 1200V with derating vactor at 70%.

VR1 though VR3 are Metal-Oxide Varistors that are used for transient voltage surge suppression, short circuit protection, load dumping that happens to the supply voltage when a load is removed rapidly—spike; see ISO 7637. GDT and TVSs were also used for protecting the circuit from surges, lightning, inductive load switching, ESD and EFT.

During surge event, MOVs will clamp and conduct first into a low impedance state; then GDT will break-over and create the arc. When surge subsides, the MOVs will go back to high impedance state. PTCs will go back to low impedance state and will quench the follow current and allow GDT arc to be extinguished.

Indictor L4 and L5 are used in conjunction with capacitors C11, C12, C13, and C14 to form a Pi filter for EMI reduction. This filter provides 18 dB/Octave.

Voltage Reduction and Over-Voltage Protection:

The voltage reduction circuit is composed of 1500V MOSFET transistor, two in series Transient Voltage Suppressors (TVS), and high voltage resistors string. The input voltage stress is distributed across five 750KΩ resistor string and two TVS devise that have 33.3V breakdown voltage and 100A peak forward surge current. The resulted voltage is equal to the sum of the individual TVS breakdown voltages (i.e., 66.6V).

The high-voltage DC is applied on and derived by T1. The source of T1 allows gate current to flow from the junction capacitance $C_j$ of D6 and D8 through the resistor string R1, R2, R3, R5, R6, and R8 to turn on T1. D6 and D8 are forming a clamping network that ensures clamped voltage at the source of T1 remains at 66.6V and any voltage above 66.6V will be dissipated across T1. R4 and R7 limit the current through T1. R10 and L3 are used to limits high frequency ringing that occurs when D6 and D8 conduct. D2 is used to limit T1 $V_{GS}$ to 15V. C5 and C8 are placed very close to U1 VIN pin to minimize the effect of differential mode EMI noise by shunting any switching induced noise current to ground. D7 forms another layer of protection by preventing the voltage at VIN from exceeding 78V in case of a single component failure (i.e., T1, D6, and D8).

Switching Converter and Differential Capacitive Coupling:

The switching converter circuit is composed of LT8300 (U1), a high voltage monolithic isolated flyback converter with built-in power switch. U1 was configured to drive the internal power switch at 7.5 KHz switching frequency.

D1 and D4 form a claming network that limits the peak voltage across the U1 internal switching transistor due to leakage inductance of L2 during the flyback interval. L2 and C16 form a resonance circuit which has very high frequency component compared to U1 7.5 KHz switching frequency. C3, C4, C17, and C18 are X1Y1 capacitors, rated at 760 VAC/1500 VDC, which form differential capacitive coupling between primary and secondary circuits. D5, D9, D15, and D13 form a full bridge rectifier for the differential output voltage. C7 and C6 filter and smooth the rectified output voltage.

The invention claimed is:

1. A method of isolating a power supply circuit comprising:
   providing a power source;
   providing an inductor in series with a switching transistor connected to the power source; a pair of isolation capacitors connected across the switching transistor;
   providing a load connected to the isolation capacitors;
   having the isolation capacitors isolate the load from low frequency energy from the power source;
   providing a resonance circuit; and
   having the resonant circuit amplify resonant ringing.

* * * * *